Dec. 9, 1969 W. B. MAURO 3,483,342
FLUID RESPONSIVE FLOAT IN A TANK
Filed Dec. 29, 1966 3 Sheets-Sheet 3
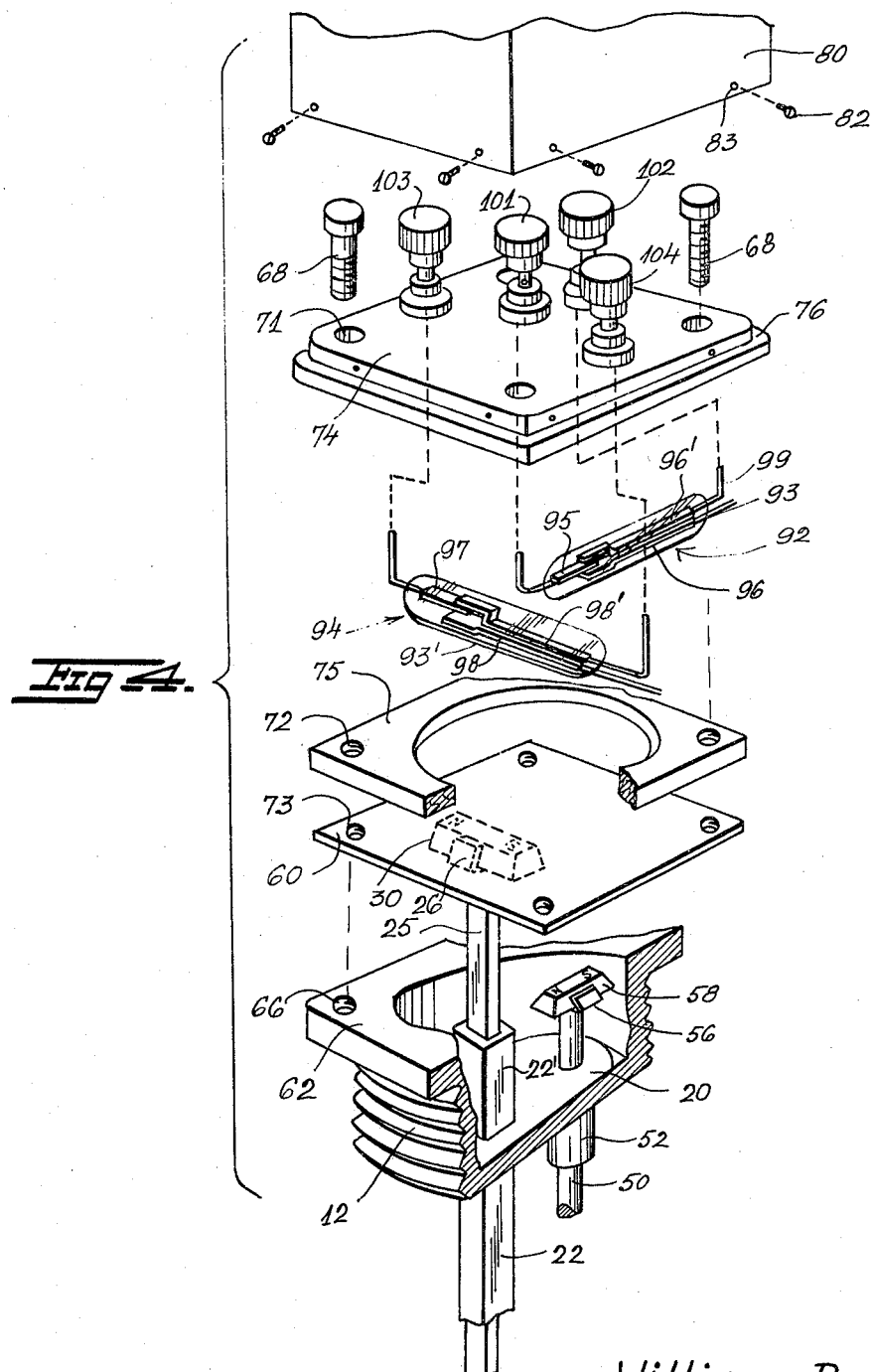
INVENTOR
William B. Mauro
BY Polachek & Saulsbury
ATTORNEYS 3,483,342
FLUID RESPONSIVE FLOAT IN A TANK
William B. Mauro, 172 Lawrence Ave.,
Brooklyn, N.Y. 11230
Filed Dec. 29, 1966, Ser. No. 605,883
Int. Cl. H01h 35/18
U.S. Cl. 200—84    2 Claims

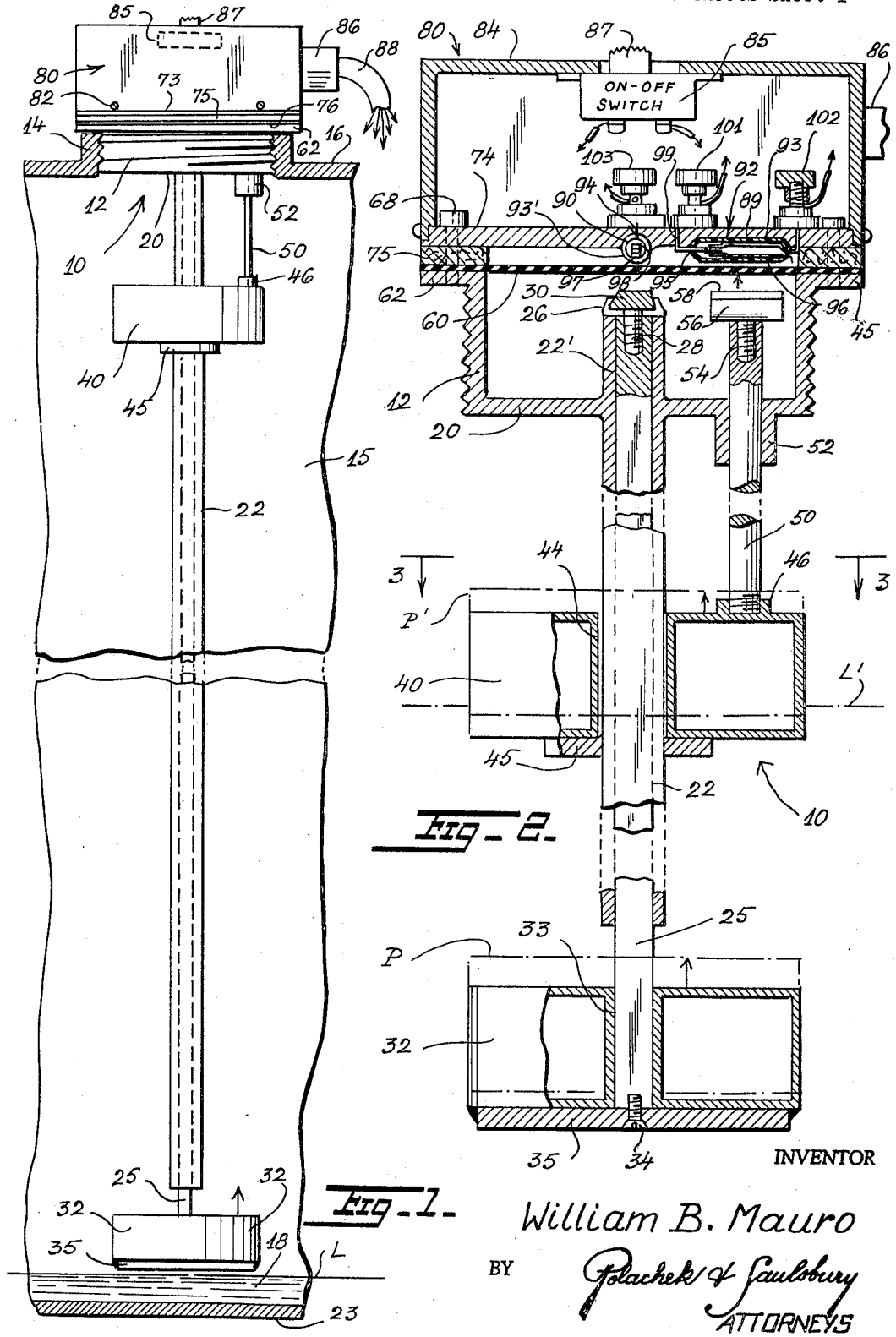

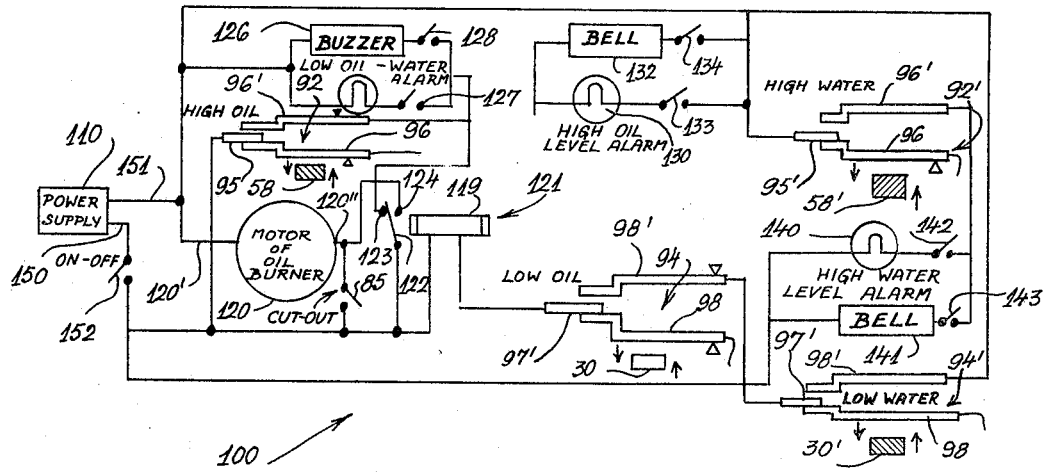
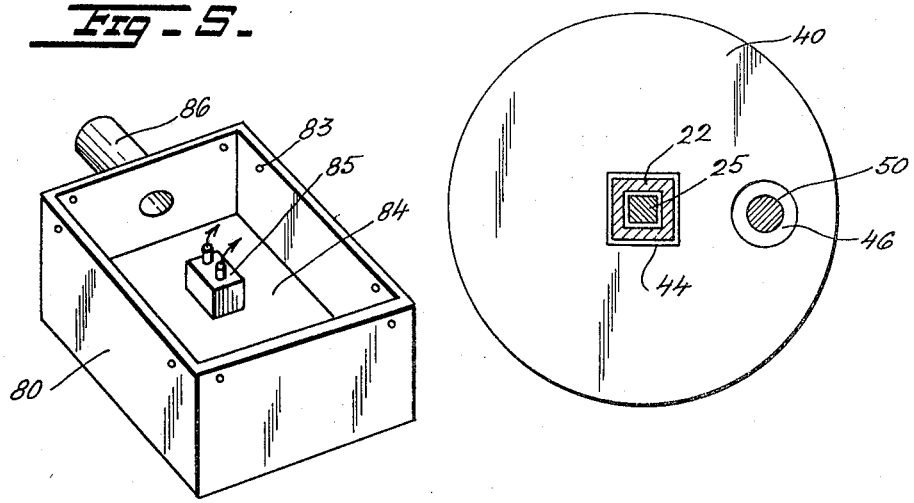

ABSTRACT OF THE DISCLOSURE

A float responsive to the level of fluid in a tank for controlling a heating system. The float actuates a switch assembly mounted in an oil or water tank of a heating system to operate a control circuit when the level of water or oil drops to a predetermined low level or rises to a predetermined high level. Magnets are associated with the switch assembly as well as signal devices for indicating when oil and water fall and rise to predetermined levels.

---

This invention relates generally to heating system controls and more particularly concerns a float actuated switch assembly mountable in an oil tank or water tank of a heating system to operate a control circuit when the level of oil or water drops to a predetermined low level or rises to a predetermined high level.

A principal object of the invention is to provide an automatic float actuated switch assembly including magnetically operated switches to operate a control circuit in a heating system.

A further object is to provide a switch assembly as described, with means for actuating magnetic switches when the level of fluid in a tank rises to a predetermined high level or falls to a predetermined low level.

Another object is to provide a switch assembly as described which can be mounted in a tank so as to be accessible from outside the tank for connection of external circuitry thereto.

Still another object is to provide a switch assembly as described, with associated signal devices for indicating when oil and water fall and rise to predetermined levels.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view of a switch assembly embodying the invention, the assembly being shown mounted in a tank, parts of the switch assembly and tank being omitted or broken away.

FIG. 2 is an enlarged vertical sectional view of the switch assembly, parts being broken away.

FIG. 3 is a cross sectional view taken on lines 3—3 of FIG. 2.

FIG. 4 is an exploded perspective view with portions broken away of parts of the switch assembly.

FIG. 5 is a perspective view of a switch and cover used in the assembly, shown in an inverted position.

FIG. 6 is a diagram of a control circuit of a heating system employing a plurality of switch assemblies according to the invention.

Referring first to FIGS. 1–5, there is shown a switch assembly 10 comprising a cylindrical cup-shaped casing 12 which is externally threaded. In FIG. 1 the casing 12 is shown engaged in internally threaded flange 14 formed on top wall 16 of a tank 15. This tank may contain oil or water 18 shown at a low level at the bottom of the tank. The cylindrical flange 14 provides an axially vertical opening into the tank.

The casing 12 has a circular bottom wall 20. A rectangular tube 22 is integrally formed with wall 20 and extends axially vertical and downward into the tank. The tube 22 terminates a short distance from the bottom 23 of the tank. Tube 22 has a short upper extension 22′ extending axially into casing 12 and terminating a short distance from the open top of the casing; see FIG. 2.

Slidably fitted in tube 22 is a rectangular rod 25. At the upper end of the rod is a bracket 26 secured by a bolt 28 to the top of the rod. Engaged in the bracket is a horizontal bar magnet 30. At the bottom end of the rod is a cylindrical hollow float 32 provided with an axial passage 33. Rod 25 extends through passage 33 and is secured by screw 34 to a circular plate 35 welded to the bottom of the float. The bottom end of tube 22 is located above the boat even when it rises to its maximum position P shown in dotted lines in FIG. 2. When the float is lowered as shown in FIG. 2, the bracket 26 rests on top of the tube extension 22′.

Another hollow cylindrical float 40 is slidably mounted on tube 22. The float has a rectangular central hole 44 larger in cross sectional area than the tube to permit the float to rise and fall freely; see FIG. 3. An annular flange 45 is secured to the fixed tube 22. This serves as a support for the float 40 in its lowermost position shown in FIGS. 1 and 2. Secured in a threaded ring 46 on top of the float 40 is a rod 50. Rod 50 extends vertically through a cylindrical guide sleeve 52 formed in and extending from the bottom of casing 12. Secured to the top of rod 50 by a bolt 54 is another bracket 56. Engaged in this bracket is another horizontal bar magnet 58 disposed lengthwise perpendicular to the lengthwise position of bar magnet 30.

Both magnets are shown in FIG. 2 spaced slightly below a thin flexible rectangular diaphragm 60. The diaphragm extends across the open top of casing 12 and is secured to annular flange 62 which extends radially from the top of the casing. Flange 62 is rectangular as clearly shown in FIG. 4 and has threaded holes 66 to receive bolts 68. The bolts pass through registering holes 71, 72, 73 in a rectangular insulation plate 74, insulation spacer ring 75 and diaphragm 60. Insulation plate 74 has a ledge 76 on which seats a removable rectangular box-like cover 80. Screws 82 in holes 83 holds the inverted cover to the plate 74. Mounted in the rectangular top wall 84 of the cover is a manually operable switch 85 whose operating arm 87 is exposed at the top of the cover. A nipple 86 extends laterally of the cover. Cable 88 extends through the nipple to the interior of the cover. This cable contains electric wires connected to an external circuit.

Secured to the underside of insulation plate 74 in recesses 89, 90 are two magnetically operable switches 92, 94. Switch 92 has a tubular housing 93 made of thin insulative material such as glass, ceramic or plastic. Inside this housing is a short fixed metal contact 95, and two parallel spaced movable longer magnetic steel lower and upper contacts 96, 96′. Conctast 96, 96′ are flexible and are secured at one end to one end wall of the housing 93 so that the other free end of the lower contact 96 is normally closed upon contact 95 while the upper contact 96′ is normally spaced from contact 95. Switch 94 is constructed like switch 92 with housing 93′ containing fixed contact 97 and movable lower and upper magnetic contacts 98, 98′. Wires 99 are connected to the contacts at opposite ends of the housings 93 and 93′. These wires extend through holes in the insulation plate 74 and terminate respectively at binding posts 101–104 mounted on top of plate 74 and provided for certain of these wires. Other binding posts can be provided for the upper contacts 96′ and 98′ for any desired signal purpose.

It will be noted that switch 92 is disposed horizontally and transversely of the casing 12 in the same vertical plane as bar magnet 58. Switch 94 which is axially perpendicular to switch 92 is also horizontal and disposed in the same vertical plane as bar magnet 30. In the lowered position of both magnets 30, 58 as shown in FIG. 2, switch contacts 95, 96, and 97, 98 are all closed while contacts 93' and 98' are in their open positions. The magnets are then spaced too far below the switches to affect the positions of movable magnetic contacts 96, 96', 98, 98'. When either magnet is elevated to push diaphragm 60 up to switch 92 or 94, then the elevated magnet will serve to close the associated switch 96' and 98' and open the lower contacts 96 and 98. The other switch will not be operated and will remain open. Thus, switch contact 98' closes and contacts 98 opens when the float 32 is elevated by fluid 18. When the level of fluid rises to or beyond upper level L' float 40 rises to position P' and switch contact 96' closes and contact 96 opens. The switch contact 96' is open at all times that the fluid level is below level L'. Diaphragm 60 serves to isolate the switches and other electrical components from the vapor of fluid 18 in the tank which may otherwise impair their operation. The diaphragm also serves to protect the switches from direct contact by the magnets. The diagram further provides a minimum dielectric gap in the magnetic circuits between the magnets and the magnetic parts of the switches which improves the operation of the switches.

FIG. 6 shows circuit 100 which is the control circuit of a heating system employing two switch assemblies identical to switch assembly 10 as described above. In this circuit one switch assembly employs magnetic switches 92 and 94 for monitoring high and low oil levels in an oil tank such as tank 15 shown in FIG. 1. Another pair of magnetic switches 92' and 94' identical in structure and arrangement to switches 92 and 94 monitor high and low water levels in a water tank of the system. Magnets 58 and 30 serve to close switches 92, 94 respectively and magnets 58', 30' serve to close switches 92', 94' respectively. The circuit includes a suitable power supply 110 and a motor 120 used in an oil burner of the system. The system further includes a relay 121 including a coil 119 which operates movable contact 122. Contact 122 is normally closed with contact 123 when the relay is deenergized. The contact 122 closes with contact 124 when the relay is energized. Switch 85 arranged as shown in FIGS. 1, 2 and 5 is a cut-out switch connected in series with relay coil 119.

The system is provided with alarms for signaling low and high oil and water level conditions. The low oil and water level alarm includes a lamp 125 connected in parallel with a buzzer 126. Switches 127 and 128 are provided for cutting off either or both the buzzer and lamp. The high oil level alarm comprises a lamp 130 in parallel with a bell 132 each being provided with a series switch 133, 134. The high water level alarm includes lamp 140 in parallel with bell 141 and series switches 142, 143.

In series with one terminal 150 of power supply 110 is an ON-OFF switch 152 which is manually controllable. Terminal 150 is connected via switch 152 to relay contact 122 and to one end of relay coil 119. Also connected to terminal 150 via switch 152 is switch 85, lamp 140, bell 141, switch contact 95, lamp 140, and bell 141. Terminal 151 of the power supply is conected to lamp 125, buzzer 126, switches 133, 134, switch contacts 95' and 98'. Switch contact 96 is connected to lamp 130 and bell 132. Switch contact 97 is connected to the relay coil 119. One end 120' of motor 120 is connected to power supply terminal 151. The other end 120" of the motor is connected to relay contact 124. Relay contact 123 is connected to switches 127, 128. Switch contact 96' is connected to switches 142, 143. Switch contact 98 is connected to contact 97'. Cut-out switch 85 is connected to motor terminal 120".

In operation of circuit 100, suppose each of switches 127, 128, 133, 134, 142 and 143 is closed and switch 85 is open. The motor 120 will not run because it is open circuited at relay contact 124. Suppose now that the oil in the tank is at a level sufficient to cause magnet 30 to be raised and the water level is high enough to raise magnet 30'. Contacts 97, 98 of switch 94 and contacts 97', 98' of switch 94' will close, thus completing the power supply circuit of relay 121. The relay will be energized and contacts 122, 124 will close to start the oil burner motor 120. If the oil level falls to low, switch 94 will open to deenergize the relay and contacts 123, 124 will close to energize the lamp 125 and buzzer 126 of the low oil and water level alarm. Thus immediate remedial action can be taken to replenish the oil supply.

Suppose the oil tank is being filled with oil and the oil level rises too high. Then magnet 58 will rise to close switch contacts 95, 96. The lamp 130 and bell 132 of the high oil level alarm will be energized, so that the supply of oil to the oil tank can be cut off. It will be noted that in this case the motor 120 is not cut off. Suppose the water level in the system falls to low. Then the magnet 30' which held switch contacts 97', 98' closed will open and the relay 121 will become deenergized to stop the oil burner motor 120. At the same time lamp 125 and buzzer 128 of the low oil and water level alarm will become energized and to signal the low water condition so that remedial action can be taken. If the water level rises too high while water is being fed into the water tank, magnet 58' will rise to close switch contacts 95, 96' and the high water alarm lamp 140 and bell 141 will become energized so that action can be taken to cut off the supply of water. In this situation, the motor 120 is not cut off.

If it is desired to cut out the alarm systems or any part thereof, the appropriate switches in series with the signal units can be opened. If it is desired to cut off the automatic control of the motor 120, switch 85 will be closed. Then the motor will be under control of the manually operable switch 152 and not of relay 121. The system is thus very flexible and can be operated in any way desired.

While the use of switch assembly 10 has been described in connection with a heating system, it can be used in any system in which low and/or high fluid levels are required to be monitored. The switch assembly 10 is relatively simple in construction and will operate entirely automatically.

What is claimed is:

1. A device responsive to the level of fluid in a tank comprising a casing; means for mounting the casing on the tank; a fixed tube extending axially downward from the casing for extension into the fluid in the tank; a rod slidably mounted in the tube and having a lower end extending out of the lower end of the tube; a float secured to the lower end of the rod for floating on the fluid and for moving the rod in the tube; a magnet secured at the upper other end of the rod and disposed in said casing; a magnetically operable switch; means supporting said switch above said magnet, whereby the switch will be magnetically operated by the magnet when the rod is raised by the float when the level of fluid in the tank is above a predetermined low level, and whereby the switch will be deactivated when the rod is lowered by the float when the level of fluid in the tank falls to said low level; a second float slidably mounted on said tube; a second rod connected to said second float and extending vertically, said second rod having an upper end extending into said casing; a second magnet secured to the upper end of the second switch above the upper end of the second rod, whereby the second switch will be magnetically operated by the second magnet when the second rod is raised by the second float when the level of fluid in the tank rises to a predetermined high level; a thin flexible diaphragm supported on and extending across said casing, said diaphragm extending between the switches and magnets to isolate the switches from the fluid in the tank and to prevent direct contact between the switches and respective magnets; a stop member secured to the tube to support the second float when the level of fluid in the tank is below said predetermined high level with the second magnet spaced sufficiently below said second switch to deactivate the same; a box-like cover mounted on said casing; means supporting the switches comprising an insulation plate extending across the casing above said diaphragm; spacer separating the insulation plate and diaphragm; and terminal members for electrical conductors mounted on said insulation plate, opposite ends of one switch being connected to two of said terminal members respectively, opposite ends of the other switch being connected to two others of said terminal members respectively, so that both switches can be connected to an external circuit.

2. A device as recited in claim 1, further comprising a manually operable switch mounted on said cover and connectable in said external circuit with the magnetically operable switches so that both magnetically operable switches can be rendered inactive in said external circuit when the manually operable switch in operated.

References Cited

UNITED STATES PATENTS

| | | | |
|---|---|---|---|
| 1,323,113 | 11/1919 | Sprangers | 200—84 |
| 1,392,652 | 10/1921 | Muzzy | 200—84 |
| 2,536,273 | 1/1951 | Gahagan. | |
| 3,167,623 | 1/1965 | Kaleta. | |

FOREIGN PATENTS 553,090  5/1943  Great Britain.

ROBERT K. SCHAEFER, Primary Examiner

D. SMITH, JR., Assistant Examiner